United States Patent
Bradfield et al.

(10) Patent No.: US 7,076,577 B2
(45) Date of Patent: Jul. 11, 2006

(54) PIPELINE SCSI NEXUS ASSOCIATIVITY CIRCUIT

(75) Inventors: Travis A. Bradfield, Colorado Springs, CO (US); Robert E. Ward, Colorado Springs, CO (US); Gregory A. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 225 days.

(21) Appl. No.: 10/715,063

(22) Filed: Nov. 17, 2003

(65) Prior Publication Data

US 2005/0108449 A1    May 19, 2005

(51) Int. Cl.
 *G06F 3/00* (2006.01)
(52) U.S. Cl. .............................. 710/33; 710/5; 710/31; 710/104; 707/4; 707/100
(58) Field of Classification Search .................. 710/5, 710/31, 33, 104; 707/4, 100
See application file for complete search history.

(56) References Cited

U.S. PATENT DOCUMENTS

| | | | | |
|---|---|---|---|---|
| 5,404,549 | A | * | 4/1995 | Tausheck ........................ 707/4 |
| 6,513,079 | B1 | * | 1/2003 | Day ............................ 710/104 |
| 6,606,630 | B1 | * | 8/2003 | Gunlock ...................... 707/100 |
| 6,922,414 | B1 | * | 7/2005 | Gunlock ...................... 370/412 |

\* cited by examiner

*Primary Examiner*—Tammara Peyton
(74) *Attorney, Agent, or Firm*—Yee & Associates, P.C.

(57) ABSTRACT

An innovative circuit is disclosed that enhances performance on a SCSI bus by pipelining nexuses in order to associate all nexus attributes on a per nexus basis. For example, a pipeline of nexuses is created so as to associate all of the nexus attributes from different connections involved. A plurality of load stages is provided whereby each load stage can latch all nexus attributes received at that stage. The latched nexus attributes can be loaded and stored at that stage or shifted to the next stage. As a result of the loading and shifting operations, a pipeline of nexuses is created that associates all of the nexus attributes received from the different connections on a per nexus basis. Therefore, all types of data traffic can be processed concurrently on a SCSI bus, which enhances data throughput and bus performance.

23 Claims, 2 Drawing Sheets

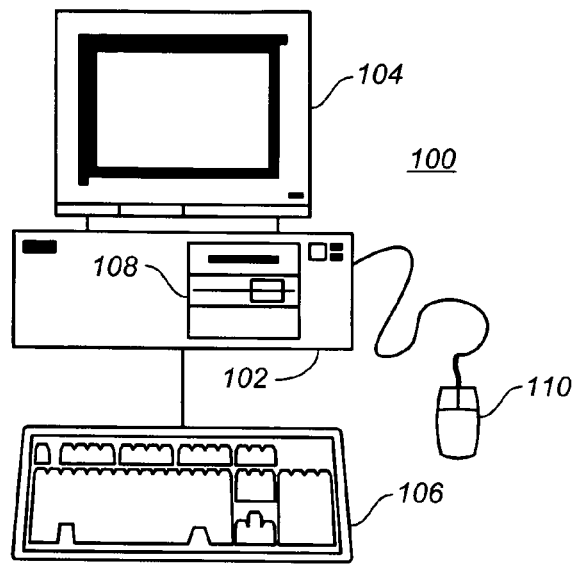
FIG._1
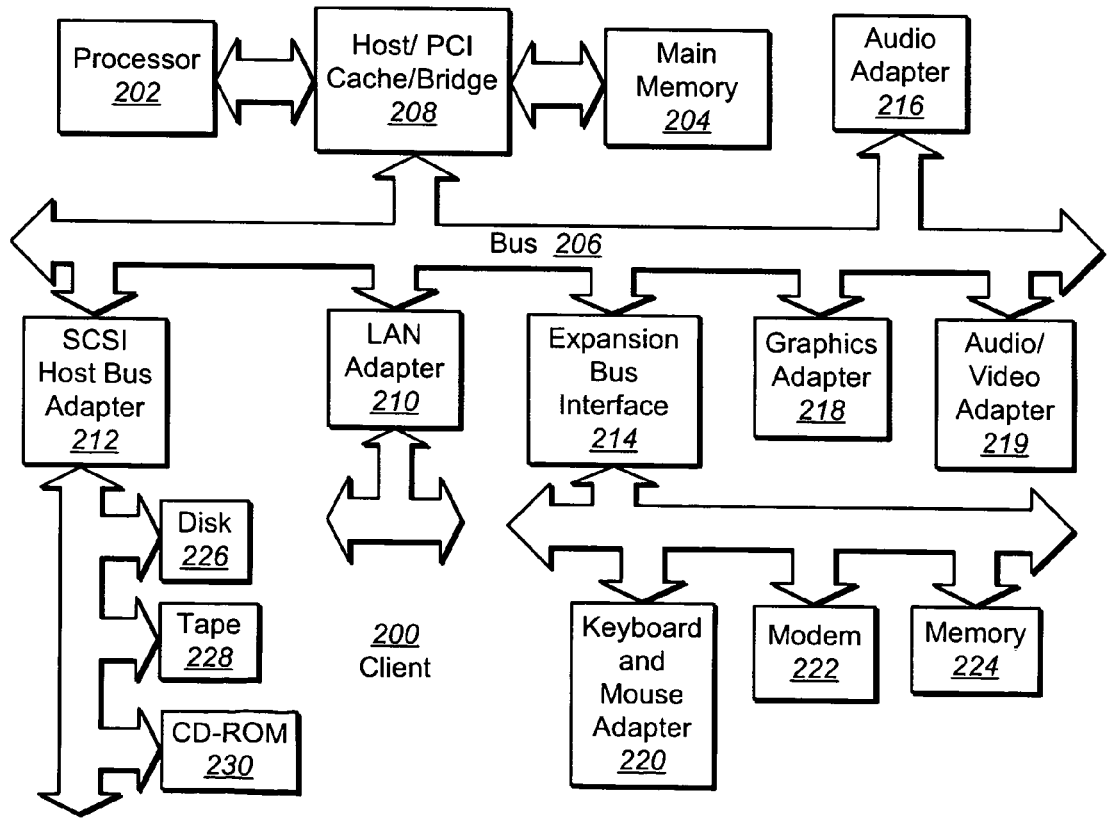
FIG._2

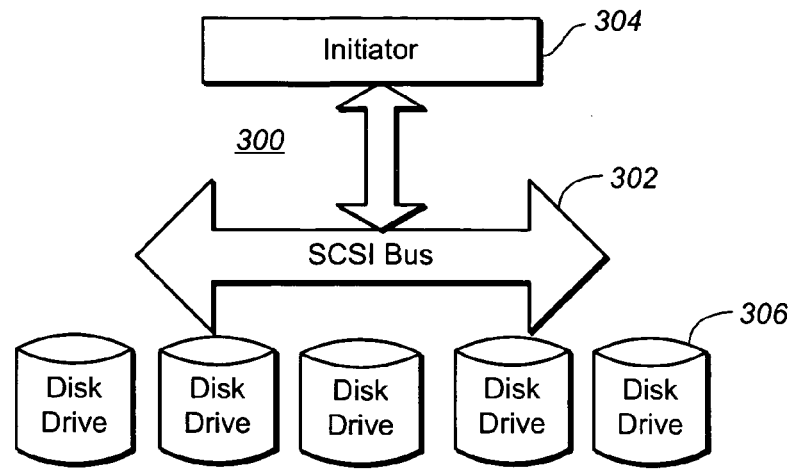
FIG._3
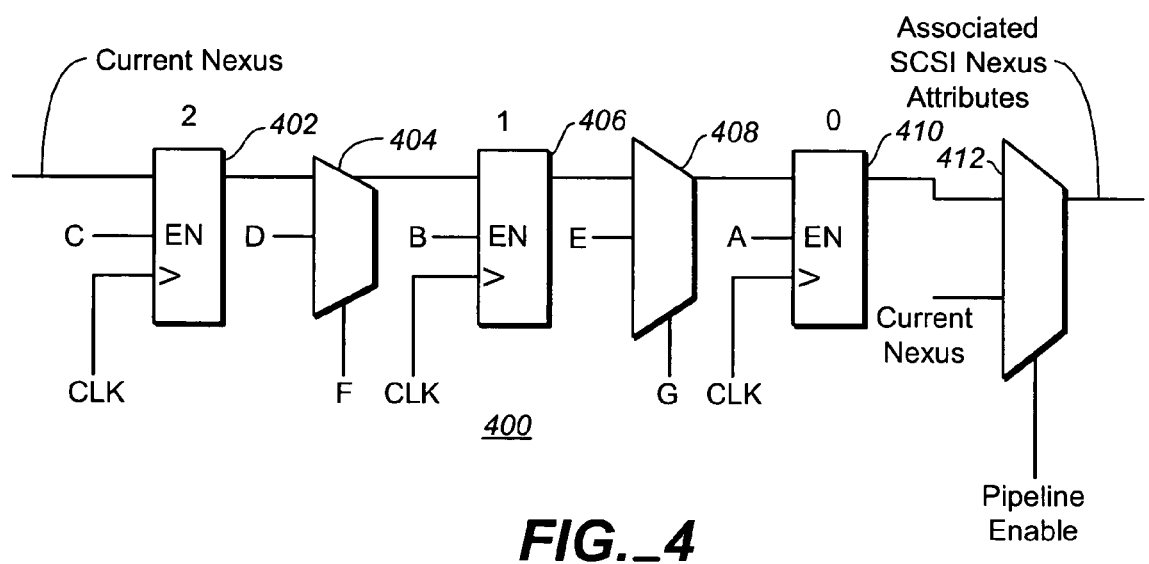
FIG._4

PIPELINE SCSI NEXUS ASSOCIATIVITY CIRCUIT

BACKGROUND OF THE INVENTION

1. Technical Field

The present invention is directed generally toward a method and apparatus for improving performance in a Small Computer System Interface (SCSI) topology, and in particular, the present invention provides a method and apparatus for improving performance on a SCSI bus by pipelining SCSI nexuses to associate nexus attributes and enhance data throughput.

2. Description of the Related Art

SCSI is a hardware interface system that allows for the connection of multiple devices to a single SCSI host adapter. Typically, this host adapter is connected to a motherboard in a computer through a Peripheral Component Interconnect (PCI) slot. With this type of system, peripherals are daisy chained together. These peripherals have a second port used to connect the next device in line. This type of interface system is widely used, from desktop Personal Computers (PCs) to mainframe computers, and in Redundant Array of Independent Disks (RAID) configurations.

Information can be transferred on a SCSI bus between two SCSI devices at any given time. When two SCSI devices transfer information on a SCSI bus, one device functions as an initiator and the other as a target. An initiator initiates an Input/Output (I/O) process on a bus, and the target performs the I/O process involved. SCSI devices may be arranged as any combination of initiators and targets, but there has to be at least one of each. An initiator can also be referred to as a SCSI initiator port, and a target can also be referred to as a SCSI target port.

"Information unit" transfers on a SCSI bus are parallel transfers of information, such as, for example, data, status, commands, task attributes, task management information, nexus information, and SCSI Parallel Interface (SPI) information unit Cyclic Redundancy Check (iuCRC) information. If information units are to be transferred on a SCSI bus, an I/O process is initiated by establishing a nexus. A nexus is a relationship that exists for transferring information units between a SCSI initiator port and a SCSI target port. This relationship can be extended to a logical unit (an addressable entity within a SCSI target device) and a queue tag (parameter associated with a task for a logical unit from a SCSI initiator port).

Currently, many SCSI initiators can process only one type of data traffic at a time. For example, an initiator can establish a nexus to transfer certain data to a target. For one type of data, the initiator may assemble the data as information units into packet form. The packetized data is then transferred to the target. For another type of data, the initiator may establish another nexus and again transfer data to the target as information units, but now in non-packetized form. However, the transfer of the non-packetized data is not allowed to proceed until the initiator has completed the packetized data transfer. These queuing delays create stall conditions on the SCSI bus, which significantly reduces data throughput on the bus and thereby degrades system performance.

A similar throughput problem arises when existing initiators attempt to process SCSI bus status packets. For example, for any given nexus, a conventional initiator can process only one SCSI bus status packet at a time. This serial processing of status packets creates stall conditions on the SCSI bus, which in turn, reduces data throughput and degrades performance of the bus.

Therefore, it would be advantageous to have an improved method and apparatus for pipelining SCSI nexuses so as to associate all nexus attributes on a per nexus basis, and thereby increase data throughput and performance on a SCSI bus.

SUMMARY OF THE INVENTION

The present invention enhances performance on a SCSI bus by pipelining nexuses in order to associate all nexus attributes on a per nexus basis. One example embodiment describes an apparatus and method for improving data throughput on a SCSI bus, by creating a pipeline of nexuses to associate all of the nexus attributes from the different connections involved. In this embodiment, a plurality of load stages is provided whereby each load stage can latch all nexus attributes received at that stage. The latched nexus attributes can be loaded and stored at that stage or shifted to the next stage. As a result of the loading and shifting operations, a pipeline of nexuses is created that associates all of the nexus attributes received from the different connections on a per nexus basis. Therefore, all types of data traffic can be processed concurrently on a SCSI bus, which enhances data throughput and bus performance.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 shows an overview of a computer system consistent with implementing a preferred embodiment of the present invention;

FIG. 2 shows a block diagram of a computer system consistent with implementing a preferred embodiment of the present invention;

FIG. 3 shows a block diagram showing a typical SCSI bus consistent with a preferred embodiment of the present invention; and FIG. 4 shows a diagram for the innovative circuit for implementing a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a PCI local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, Local Area Network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention can be performed by processor 202 using computer implemented instructions, which may be located in a memory such as, for example, main memory 204, memory 224, or in one or more peripheral devices 226–230.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer, hand held computer, or a Personal Digital Assistant (PDA). Also, data processing system 200 may be a kiosk or a Web appliance.

FIG. 3 shows an example of a parallel SCSI bus 302 with an initiator 304 and five target devices 306. Initiator 304 is a device that begins a SCSI transaction by issuing a command to another device (the SCSI target), giving it a task to perform. Typically a SCSI host adapter is the initiator but other targets or devices may also become initiators. Target 306 in this example is a disk drive, but a target can be any SCSI device that executes a command from a SCSI initiator to perform some task. Typically, the target is a SCSI peripheral device but the host adapter can also be a target.

With reference now to FIG. 4, a diagram is shown of an example circuit for pipelining nexuses and associating nexus attributes that can be used to implement a preferred embodiment of the present invention. Exemplary nexus pipeline circuit 400 can be implemented as a component of an initiator, such as, for example, initiator 304 in FIG. 3. However, more generally, nexus pipeline circuit 400 may be implemented as a component of a SCSI controller, such as, for example, a RAID SCSI controller LSI53C1035B0 or a Full Initiator Target Mode controller LSI53C1030TA0 manufactured by LSI Logic, Inc. In this regard, nexus pipeline circuit 400 may be used for associating nexuses and/or nexus attributes as part of (or prior to) a data transfer process on a SCSI bus. For example, nexus pipeline circuit 400 may be used by an initiator to process and group data of different types to be transferred to a target. As another example, nexus pipeline circuit 400 may be used by a controller to associate a group of nexus attributes for a transfer of bus status packets (e.g., a grouping of the nexus attributes for status packets).

Nexus pipeline circuit 400 preferably includes a plurality of load stages 0, 1, 2, . . . n. For this example, three load stages (0, 1, 2) are depicted for illustrative purposes, but the number of load stages ("n") used is not intended as an architectural limitation for the present invention. An input to the highest-level load stage (e.g., load stage 2 for this example) of nexus pipeline circuit 400 is a current nexus (i.e., most currently received) from a particular connection. For example, a current nexus can be a nexus received for a status packet from a target. An output of nexus pipeline circuit 400 is a grouping or association of all nexus attributes received by the load stages at different times and from different connections. Examples of associated nexus attributes can be packetized data, non-packetized data, data transfer rates, etc.

For this exemplary embodiment, each load stage 0, 1, 2, . . . n includes a flip-flop (e.g., 402, 406, 410) and a multiplexer (e.g., 404, 408, 412). Essentially, the primary function of each flip-flop 402, 406, 410 is to latch all nexus attributes at that flip-flop's respective stage, and load or shift the attributes received at that stage. The primary function of each multiplexer 404, 408, 412 is to select one of two inputs: (1) the nexus attributes currently received at that respective stage; or (2) the nexus attributes from the next stage.

Specifically, for this example, at stage 0, flip-flop 410 receives an instruction (A) to "load stage 0" or "shift entry".

A "load stage (n)" instruction can be asserted as instruction "A" based on a "REQ (Request) of Target on Packet command. For this example, this REQ command is associated with the type of packet being processed for packetized data, and the type of data being processed for non-packetized data. For example, a REQ (request) can be made to the initiator to invoke a service.

The "shift entry" instruction can be asserted as instruction "A" to flip-flop 410 based on certain conditions, such as, for example, the nexus most currently received that is associated with a data packet that has been completely processed for transfer (e.g., for packetized data), the time period required to execute the next packet being ingressed, or the type of data involved (e.g., for non-packetized data). In other words, instruction "A" can cause flip-flop 410 to load or shift the nexus attributes received at stage 0.

Also at stage 0, multiplexer 408 can receive the current nexus attributes at "E". Additionally, multiplexer 408 can receive an instruction "G" to "load stage 0". Essentially, multiplexer 408 can select the nexus attributes most currently received at "E" or the nexus attributes received from stage 1 (e.g., latched by flip-flop 406).

Similar to the operation of stage 0, at stage 1, flip-flop 406 can receive an instruction (B) to "load stage 1" or "shift entry". As such, instruction "B" can cause flip-flop 406 to load or shift the nexus attributes received at stage 1. Also at stage 1, multiplexer 404 can receive the current nexus attributes at "D". Also, for this example, multiplexer 404 can receive an instruction "F" to "load stage 1". Essentially, multiplexer 404 can select the nexus attributes most currently received at "D" or the nexus attributes received from stage 2 (e.g., latched by flip-flop 402). Similarly, at stage 2, flip-flop 402 can receive an instruction "C" to "load stage 2" or "shift entry". As such, instruction "C" can cause flip-flop 402 to load or shift the nexus attributes received at stage 2.

As described above, a current nexus can be received as an input to multiplexer 412. A "pipeline enable" command can be received at a second input of multiplexer 412. If a pipeline enable command is received, all of the SCSI nexus attributes pipelined through stages 0, 1, 2, . . . n are provided as an output from multiplexer 412 and nexus pipeline circuit 400. As such, in accordance with the present invention, nexus pipeline circuit 400 functions primarily to associate all of the SCSI nexus attributes received from different connections at different times.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A system for enhancing data throughput on a bus in a SCSI topology, comprising:

an initiating unit, said initiating unit operable to initiate transactions on the bus;

at least one target unit, said at least one target unit operable to execute commands received from said initiating unit; and a nexus pipeline unit, said nexus pipeline unit coupled to at least one unit of said initiating unit and said at least one target unit, said nexus pipeline unit operable to:

receive a plurality of nexuses, each nexus of said plurality of nexuses related to a transaction initiated on the bus; and form an association for said plurality of nexuses received.

2. The system of claim 1, wherein said initiating unit is an initiator.

3. The system of claim 1, wherein said at least one target unit comprises a target drive.

4. The system of claim 1, wherein said initiating unit is a SCSI adapter.

5. The system of claim 1, wherein said initiating unit is a controller.

6. The system of claim 1, wherein said association for said plurality of nexuses comprises a plurality of nexus attributes associated as a related grouping of attributes.

7. The system of claim 1, wherein said nexus pipeline unit comprises a plurality of load stages, wherein at least one load stage of said plurality of load stages is operable to load at least a first nexus attribute or shift at least one nexus attribute to a second load stage of said plurality of load stages.

8. The system of claim 1, wherein said nexus pipeline unit comprises a plurality of latching units and a plurality of multiplexing units.

9. The system of claim 1, wherein said nexus pipeline unit comprises a plurality of load stages, wherein at least one load stage of said plurality of load stages includes at least one flip-flop device and at least one multiplexer device coupled together.

10. A method for enhancing data throughput on a bus in a SCSI topology, the method comprising the steps of:

an initiator unit initiating transactions on the bus;

a target unit executing commands associated with said initiating step;

coupling said initiating unit to said target unit with a nexus pipeline unit, said nexus pipeline unit performing the steps of:

receiving a plurality of nexuses, each nexus of said plurality of nexuses related to a transaction initiated on the bus; and forming an association for said plurality of nexuses received.

11. The method of claim 10, wherein said initiating unit is an initiator.

12. The method of claim 10, wherein said target unit comprises a target drive.

13. The method of claim 10, wherein said initiating unit is a SCSI adapter.

14. The method of claim 10, wherein said initiating unit is a controller.

15. The method of claim 10, wherein said association for said plurality of nexuses comprises a plurality of nexus attributes associated as a related grouping of attributes.

16. The method of claim 10, wherein said nexus pipeline unit comprises a plurality of load stages, at least one load stage of said plurality of load stages performing the steps of:

loading at least a first nexus attribute; and shifting at least one nexus attribute to a second load stage of said plurality of load stages.

17. The method of claim 10, wherein said nexus pipeline unit comprises a plurality of latching units and a plurality of multiplexing units.

18. The method of claim 10, wherein said nexus pipeline unit comprises a plurality of load stages, wherein at least one load stage of said plurality of load stages includes at least one flip-flop device and at least one multiplexer device.

19. A computer program product for enhancing data throughput on a bus in a SCSI topology, comprising:
first instructions for initiating transactions on the bus;
second instructions for executing commands associated with said first instructions;
third instructions for receiving a plurality of nexuses;
fourth instructions for relating each nexus of said plurality of nexuses to a transaction initiated on the bus; and
fifth instructions for forming an association for said plurality of nexuses received.

20. The computer program product of claim 19, wherein said initiating unit is an initiator.

21. The computer program product of claim 19, wherein said target unit comprises a target drive.

22. The computer program product of claim 19, wherein said initiating unit is a SCSI adapter.

23. The computer program product of claim 19, wherein said initiating unit is a controller.

* * * * *